(12) United States Patent
Renkel et al.

(10) Patent No.: US 7,359,370 B1
(45) Date of Patent: Apr. 15, 2008

(54) METHOD OF COMMUNICATING BETWEEN NETWORK DEVICES THROUGH GATEWAYS USING CALL DISCRIMINATION OPTIONS

(75) Inventors: James A. Renkel, Warrenville, IL (US); Michael G. Nicholas, Wheeling, IL (US)

(73) Assignee: 3Com Corporation, Marlborough, MA (US)

( * ) Notice: Subject to any disclaimer, the term of this patent is extended or adjusted under 35 U.S.C. 154(b) by 1143 days.

(21) Appl. No.: 10/375,709

(22) Filed: Feb. 27, 2003

(51) Int. Cl.
 *H04L 12/66* (2006.01)
 *H04J 3/22* (2006.01)
(52) U.S. Cl. ............... 370/352; 370/401; 370/465
(58) Field of Classification Search ............ None
 See application file for complete search history.

(56) References Cited

U.S. PATENT DOCUMENTS

| | | | |
|---|---|---|---|
| 7,167,469 B2* | 1/2007 | Abrishami et al. | 370/352 |
| 2001/0033642 A1* | 10/2001 | Abrishami et al. | 379/100.01 |
| 2003/0210677 A1* | 11/2003 | Grove et al. | 370/352 |
| 2004/0022241 A1* | 2/2004 | Boynton et al. | 370/389 |
| 2004/0059823 A1* | 3/2004 | Garakani et al. | 709/230 |

OTHER PUBLICATIONS

International Telecommunication Union (ITU-T), "Pulse Code Modulation (PCM) of Voice Frequencies", ITU-T Recommendation G.711; 1988, 1993.
International Telecommunication Union (ITU-T), "Coding of Speech At 8 kbits/s Using Conjugate-Structure Algebraic-Code-Excited Linear-Prediction (CS-ACELP)", ITU-T Recommendation G.729; 1996.
International Telecommunication Union (ITU-T), "Dual Rate Speech Coder For Multimedia Communications Transmitting at 5.3 and 6.3 kbit/s", ITU-T Recommendation G.723.1; 1996.
International Telegraph and Telephone Consultative Committee (CCITT), "General Aspects of Digital Transmission Systems; Terminal Equipments: 40,32,24,16 kbits/s Adaptive Differential Pulse Code Modulation (ADPCM)", CCITT Recommendation G.726; 1990.
Internet Engineering Task Force (IETF), Requests For Comments (RFC) 2833, "RTP Payload For DTMF Digits, Telephony Tones and Telephony Signals", May 2000.
Internet Engineering Task Force (IETF), Requests For Comments (RFC) 791, "Internet Protocol: DARPA Internet Program Protocol Specification", Sep. 1981.

(Continued)

*Primary Examiner*—Huy D. Vu
*Assistant Examiner*—Clemence Han
(74) *Attorney, Agent, or Firm*—McDonnell Boehnen Hulbert & Berghoff LLP

(57) ABSTRACT

A method and system of setting up a call over a circuit or packet switched network. Network elements exchange an automode sequence of signals to determine a modulation that both devices support and that will be used for the connection between them. The two elements may exchange the automode signals end-to-end, and then switch to a modulation scheme by negotiating an appropriate modulation or one supported by both endpoints. Alternately, each element can execute a split automode sequence with a separate network endpoint to determine the modulation to be used between the network elements. The network elements and network endpoints may negotiate a modulation scheme by exchanging integers that are indicative of the capabilities of the network elements to determine which supported modulation scheme is most desirable in the particular configuration of the elements.

24 Claims, 14 Drawing Sheets

OTHER PUBLICATIONS

International Telecommunication Union (ITU-T), "Series T: Terminals For Telematic Services: Procedures For Document Facsimile Transmission In The General Switched Telephone Network", ITU-T Recommendation T.30; 2000.

International Telecommunication Union (ITU-T), "Series T: Terminals For Telematic Services: Procedures For Real-Time Group 3 Facsimile Communication Over IP Networks", ITU-T Recommendation T.38; 2002.

International Telecommunication Union (ITU-T), "1200 Bits Per Second Duplex Modem Standardized For Use In The General Switched Telephone Network and On Point-To-Point 2-Wire Leased Telephone-type Circuits", ITU-T Recommendation V.22; 1988, 1993.

International Telecommunication Union (ITU-T), "A Family of 2-Wire, Duplex Modems Operating At Data Signalling Rates Of Up To 9600 bit/s For Use On The General Switched Telephone Network and On Leased Telephone-Type Circuits", ITU-T Recommendation V.32; 1993.

International Telecommunication Union (ITU-T), "A Modem Operating At Data Signalling Rates Of Up To 28 800 bit/s For Use On the General Switched Telephone Network and On Leased Point-To-Point 2-Wire Telephone-Type Circuits", ITU-T Recommendation V.34; 1994.

International Telecommunication Union (ITU-T), "Procedures For Starting Sessions Of Data Transmission Over the General Switched Telephone Network", ITU-T Recommendation V.8; 1994.

International Telecommunication Union (ITU-T), "A Digital Modem Operating At Signalling Rates Of Up To 64 000 bit/s For Use On a 4-Wire Circuit Switched Connection and On Leased Point-To-Point 4-Wire Digital Circuits", ITU-T Recommendation V.91; 2000.

International Telecommunication Union (ITU-T), "A Digital Modem and Analogue Modem Pair For Use On the Public Switched Telephone Network (PSTN) At Data Signalling Rates of Up To 56 000 bit/s Downstream and Up To 33 600 bit/s Upstream", ITU-T Recommendation V.90; 1999.

International Telecommunication Union (ITU-T), "Enhancements To Recommendation V.90", ITU-T Recommendation V.92; 2001.

International Telecommunication Union (ITU-T), "Modem-Over-IP Networks—Foundation", ITU-T Recommendation V.150.0 (V.MoIP-f); Oct. 15-25, 2002.

International Telecommunication Union (ITU-T), "Procedures For the End-To End Connection of V-Series DCES Over An IP Network", ITU-T Recommendation V.150.1; Oct. 15-25, 2002.

Internet Engineering Task Force (IETF); Requests For Comments (RFC) 1889, "RTP: A Transport Protocol For Real-Time Applications", Jan. 1996.

Internet Engineering Task Force (IETF), Requests For Comments (RFC) 793, "Transmission Control Protocol; DARPA Internet Program Protocol Specification", Sep. 1981.

Internet Engineering Task Force (IETF), Requests For Comments (RFC) 768, "User Datagram Protocol", Aug. 28, 1980.

* cited by examiner

METHOD OF COMMUNICATING BETWEEN NETWORK DEVICES THROUGH GATEWAYS USING CALL DISCRIMINATION OPTIONS

FIELD OF INVENTION

The present invention relates to signal transmission over circuit and packet switched networks and, more particularly, to call discrimination options and negotiations over these networks.

BACKGROUND

Service providers provide telephony service to their customers using systems known generically as either circuit or packet switched systems. Circuit switched systems send data signals continuously over telephone lines to provide both Internet access and conventional analog telephony. Packet switched systems, such as the Internet, serve as a transport medium for carrying voice and data in packet form. One of the main differences between these technologies is that the circuit switched systems have a continuous circuit whereas packet switch systems transmit bursts of packets in a discontinuous manner.

When two modems (e.g., a user modem and a service provider modem) connect via a circuit switched system, such as the public switched telephone network ("PSTN"), they exchange a sequence of signals to determine a type of modulation that both modems support and that will be used for the connection between them.

Similarly, when two modems connect via a packet switched network with MoIP endpoints, they exchange signals in order to establish a connection, which can consist of one or two physical layer connections between the two modems. A one-layer connection over a packet network consists of a connection directly between the two modems and is referred to as a voice-band data ("VBD") mode connection. A two physical layer connection consists of a connection between one packet network MoIP endpoint and one modem and a connection between the other packet network MoIP and the other modem, and is referred to as a modem relay ("MR") mode connection. In the latter case, there are essentially four modems involved in the end-to-end connection between the two modems: each MoIP endpoint and its adjacent modem.

Service providers that are sensitive to the characteristics of modem connections between modems from different manufacturers may object to the fact that there may now be four modems involved in a connection when conventionally there were only two involved in a PSTN connection. In addition, with a PSTN connection, a service provider had control of the physical layer connections between modems. For example, a service provider could specify a type of modulation to be used. However, in the MR mode of a packet network connection, service providers have no control over the two "inner" modems of the MoIP network endpoints, which may not even be visible to them. Client users may have similar concerns.

In contrast, other modem users may desire to send data in the MR mode because of its improved performance and maximized efficiency. Service providers may desire data transfer to be completed in the MR mode, for example.

To address these concerns, service providers may want MoIP packet network endpoints to make only VBD connections to retain a one-layer connection over the packet network, as in traditional circuit switched networks or to make only MR connections. While a VBD mode-only endpoint can readily be constructed by simply not implementing any modulations in MR mode, it is desirable, for maximum interoperability, to have a mechanism negotiated at call setup that would allow for a negotiation between the use of a VBD mode connection or an MR mode connection for a call.

SUMMARY

In an exemplary embodiment, a method for communicating between a first and second network device, such as modems, through first and second gateways is provided. The method may be carried out in a network comprising the first network device in communication with the first gateway, the second gateway in communication with the first gateway, and the second network device in communication with the second gateway. The method includes determining whether automode signals should be exchanged between the first and second network devices and the first and second gateways in an end-to-end automode (e.g., passing signals through the gateways) or a split automode (e.g., modulating and demodulating signals as they transfer through the gateways). The method also includes exchanging the automode signals between the first and second network devices to negotiate a modulation for communication between the first and second network devices, when in the end-to-end automode. The method further includes exchanging automode signals between the first network device and the first gateway to negotiate a modulation for communication between the first network device and the first gateway, and exchanging automode signals between the second network device and the second gateway to negotiate a modulation for communication between the second network device and the second gateway, when in the split automode.

In another embodiment, the method may include using an end-to-end automode to exchange automode signals between the first and second network devices and exchanging the automode signals between the first and second network devices to negotiate a modulation for communication between the first and second network devices. The method may also include determining whether the communication between the first and second network devices should be in a first mode or a second mode, such as in a VBD or relay mode, for example. If in the first mode, the method includes negotiating a modulation for communication that is compatible with both the first and second network devices. If in the second mode, the method includes negotiating a modulation for communication that is compatible with both the first and second gateways.

In still another embodiment, the method may include using a split automode to exchange automode signals between the first and second network devices and the first and second gateways. The method also includes exchanging automode signals between the first network device and the first gateway to negotiate a modulation for communication between the first network device and the first gateway and exchanging automode signals between the second network device and the second gateway to negotiate a modulation for communication between the second network device and the second gateway. The method further includes negotiating a first modulation for communication between the first network device and the first gateway that is compatible with both the first network device and the first gateway, and negotiating a second modulation for communication between the second network device and the second gateway that is compatible with both the second network device and the second gateway.

In yet another embodiment, the method may include using an end-to-end automode to exchange automode signals between the first and second network devices and exchanging the automode signals between the first and second network devices to negotiate a modulation for communication between the first and second network devices. The method may also include determining whether the communication between the first and second network devices should be in a relay mode and transitioning into a split automode to exchange automode signals between the first and second network devices and the first and second gateways, when in the relay mode. The method may further include negotiating a first modulation for communication between the first network device and the first gateway that is compatible with both the first network device and the first gateway and negotiating a second modulation for communication between the second network device and the second gateway that is compatible with both the second network device and the second gateway.

These as well as other features and advantages will become apparent to those of ordinary skill in the art by reading the following detailed description, with appropriate reference to the accompanying drawings.

BRIEF DESCRIPTION OF FIGURES

Exemplary embodiments of the present invention are described with reference to the following drawings, in which.

DETAILED DESCRIPTION OF EXEMPLARY EMBODIMENTS

In an exemplary embodiment, two devices, such as modems, may communicate through a network by exchanging a sequence of signals. The two devices may directly communicate with each other, or they may communicate through network endpoints, such as gateways having modem capabilities. When the devices directly communicate with each other, they exchange signals in an end-to-end automode manner. By contrast, when each device executes a separate automode sequence with its adjacent gateway, they exchange signals in a split automode manner.

Furthermore, when two gateways implementing different deployment strategies first connect, they negotiate and agree on "the common ground" on which they will operate (e.g., which communication protocols they can and will implement). This could be accomplished by assigning each deployment strategy a name, and having the gateways exchange the name of the deployment strategy they implement when they first connect. Subsequently, the gateways could agree on a common operating strategy via predetermined precedence rules through the split automode exchange of signals.

Figure 1:
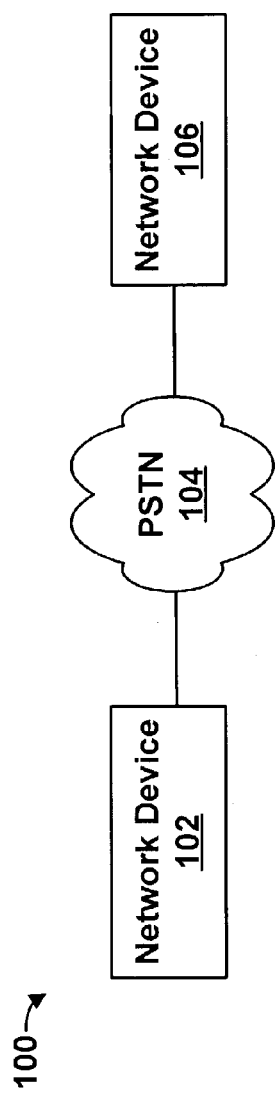
FIG. 1 is a block diagram illustrating one embodiment of a circuit switched network that demonstrates one environment in which the present invention may operate.

Referring now to the figures, and more particularly to FIG. 1, a block diagram of one embodiment of a circuit switched network 100 is illustrated. It should be understood that the network 100 illustrated in FIG. 1 and other arrangements described herein are set forth for purposes of example only, and other arrangements and elements can be used instead and some elements may be omitted altogether, depending on manufacturing and/or consumer preferences.

By way of example, network 100 includes a network device 102 (e.g., a first modem) coupled through a PSTN 104 to another network device 106 (e.g., a second modem). Each of the couplings within the network 100 may be an interface such as a trunk level 1 ("T1") line, a BRI line, a POTS line, or another connection (whether wired or wireless).

Network devices 102 and 106 illustrated in FIG. 1 represent entities that may communicate using the network 100, therefore the communication devices may represent a modem, a facsimile machine, a data network telephone, a computer, or other devices that may communicate over the network 100.

PSTN 104 provides a conventional circuit switched link between network devices 102 and 106. PSTN 104 may be a standard landline telephone network that includes any number of service control points ("SCPs"), signal switching points ("SSPs"), signal transfer points ("STPs"), and central offices. PSTN 104 may transfer signals continuously over telephone lines in order to provide a continuous circuit.

Figure 2:
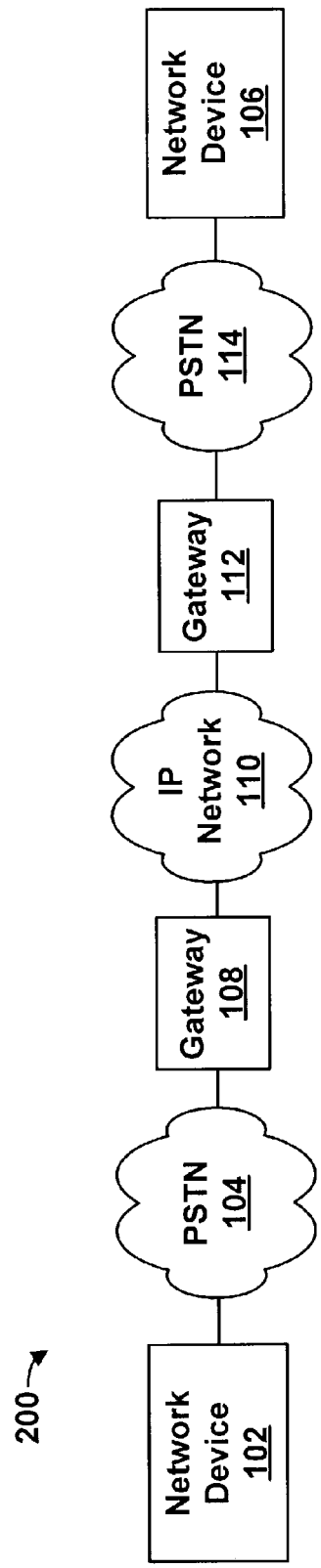
FIG. 2 is a block diagram illustrating one embodiment of a packet switched network that demonstrates another environment in which the present invention may operate.

Network devices 102 and 106 may communicate with each other through the circuit switched network 100. Additionally, network devices 102 and 106 may communicate with each other through a packet switched network 200 as illustrated in FIG. 2. Network 200 includes network device 102 coupled through PSTN 104 to a first gateway 108, which is in turn linked to an Internet Protocol ("IP") network 110. The gateway 108 couples to a second gateway 112, which establishes a communication session through a PSTN 114 to network device 106.

Although network 200 includes both circuit switched (PSTNs 104 and 114) and packet switched (IP network 110) segments, for ease of reference, network 200 will be referred to herein as a packet switched network. Likewise, reference to a packet switched network herein after may include a network with both circuit switched and packet switched segments.

IP network 110 represents any transport data packet network. IP network 110 may be any type of network that sends and receives IP data packets. In addition, IP network 110 may be arranged in any desired format such as a Wide Area Network ("WAN") or a Local Area Network ("LAN"), or may provide connectivity to such networks. IP network 110 may also provide connectivity to other data packet switching networks as well.

Gateways 108 and 112 operate to receive information from network devices 102 and 106, packetize the information, and send the data packets through the IP network 110. Gateways 108 and 112 may be any network communication devices that communicate with each other through IP network 110. Gateways 108 and 112 may be Voice over IP ("VoIP") gateways, which sample incoming audio signals to transmit audio data packets over the IP network 110. The gateways 108 and 112 may also be MoIP gateways, as defined in ITU-T Recommendation V.150, "Modem over IP Networks", January 2003, the full disclosure of which is incorporated herein by reference. Furthermore, gateways 108 and 112 may contain facsimile over IP ("FoIP") capabilities, as defined in ITU-T Recommendation T.38, "Procedures for real-time Group 3 facsimile communication over IP networks", April 2002, the full disclosure of which is incorporated herein by reference.

Networks 100 and 200 allow network devices 102 and 106 to communicate. A communication session established over network 100 may be a conventional circuit connection. However, a communication session established over network 200 has more connection options.

Figure 3:
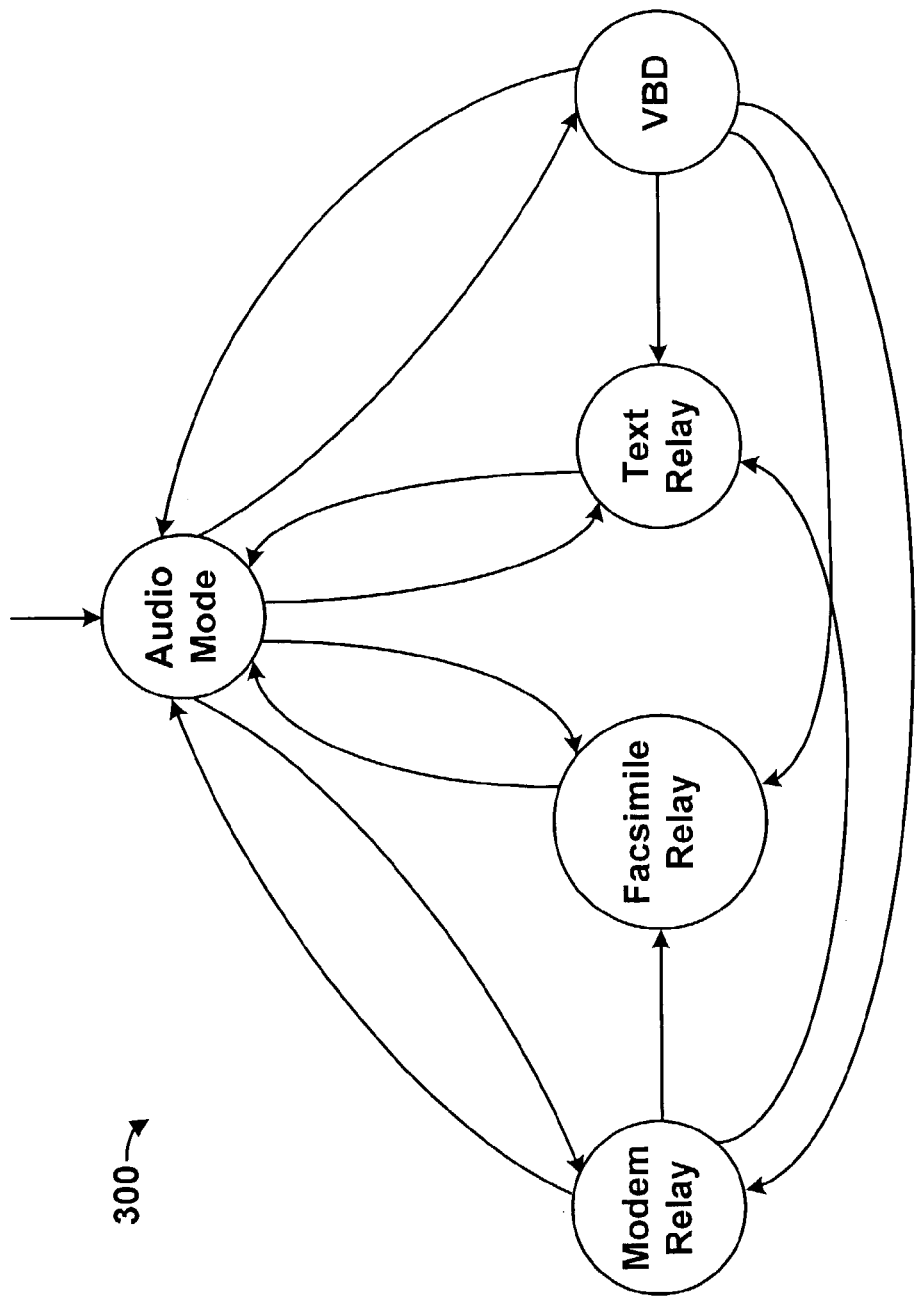
FIG. 3 is one embodiment of a state transition diagram illustrating possible operation of the communications network of FIG. 2.

FIG. 3 is state transition diagram 300 illustrating one embodiment of operation of network 200. As shown, when a call is received at gateway 106, an audio mode communication session is initially established. It should be understood, however, that the network's state machine may start at a different state and may contain more or fewer states than are illustrated in the diagram 300. Also, the states of the network's state machine can be encoded as an integer value, with the state machine initially in state "0," which may correspond to the audio mode, for example. Depending on the number of states in the network's state machine, the states can be represented by binary integer values as well.

The audio mode may be used as a starting state simply as a default choice or because most calls routed through the network 200 are audio calls. The audio mode is typically established for analog telephone calls. Audio data packets may be encoded using ITU-T G.711 or ITU-T G.723 CODECS, for example. Additionally, DTMF digits, or telephony signals, may be encoded using RFC 2833, for example. Further techniques, such as silence suppression can also be used. When in audio mode, processing of the audio appropriate to speech, such as echo cancellation, DC removal, comfort noise generation, dynamic range reduction, or latency adjustment may be performed by gateways.

Gateway 112 may receive data from gateway 108 and send the data to the addressed recipient network device 106. The gateway 112 may recognize that a modem-modem session is desired once it receives an answer tone from network device 106 after sending data that the gateway 112 received from gateway 108 to network device 106. The gateway 112 may then inform the gateway 108 that the communication session should be transitioned to the VBD mode. In one embodiment, the gateway 112 may inform gateway 108 of this transition using the "Method And System For Communicating State Information Between Devices Of A Communications Network," described in commonly owned U.S. patent application Ser. No. 10/334,702, filed on Dec. 30, 2002, the full disclosure of which is incorporated herein by reference.

VBD is mainly used when highly reliable data transmission is desired. VBD is data (e.g., fax or modem) transmitted as audio using an audio coder-decoder ("CODEC"), such as a Pulse Code Modulation A-law ("PCMA") or a Pulse Code Modulation µ-law ("PCMU") codec.

However, as shown in the diagram 200, once in the VBD mode, the gateways may transition to the modem relay mode, or if the gateways made a mistake in switching away from the audio mode, the gateways may also transition back to the audio mode. The gateways may desire to use the modem relay mode to transmit data more efficiently through the IP network 110 using the MoIP protocol, for example. The modem relay mode differs from the VBD mode because only significant information is transmitted using the modem relay mode. For example, using the VBD mode, data is received at gateway 108 on a continuous basis from network device 102, packetized, and sent to the gateway 112. And in modem relay mode, data is still received at gateway 108 on a continuous basis; however, the gateway 108 will demodulate the data from the network device 102 and only packetize significant data to be sent to the gateway 112. In this manner, when the network device 102 sends idle data to the gateway 108, such as when the network device 102 is used to connect to the Internet and the communication device is currently inactive, the gateway 108 will recognize that the data it received from network device 102 is idle data since the gateway 108 demodulates data received from the network device 102. As another example, in the modem relay mode, network capacity may not be consumed if there is not an active transmission taking place such as when a caller is put on hold. In contrast, in the VBD mode, the gateway 108 will receive otiose data, packetize the otiose data, and send it to gateway 112.

It is likely that in the above example, the modem relay mode would be most desirable for the modem-modem call. However, if a different communication device is using the network 200 to transmit and receive data, then the network 200 may continue to transition through the various modes of the diagram 300 until the proper mode is found. For example, if a facsimile machine is transmitting data through the network 200, then the network 200 may transition from the VBD mode to a facsimile relay mode, or the network may switch directly to the facsimile relay mode from the audio mode.

The facsimile relay mode is preferable to use for transmitting facsimile messages. The facsimile relay mode is similar to the modem relay mode, except the facsimile relay mode may be exclusively for use by communication devices transmitting fax data. While in the facsimile relay mode, gateways will demodulate data using facsimile modulation and protocols, such as the FoIP protocol, for example. From the facsimile relay mode, the network 200 can also transition back to the audio mode.

The gateways may also transition from the VBD to a text relay mode. The text relay mode can be used to transmit information to communication devices designed to display text, such as those designed for the hearing impaired. From the text relay mode, the network 200 can also transition back to the audio mode.

Also, if the gateways transition to the modem relay mode (either from the VBD mode or from the audio mode), they may also transition back to the audio mode thereafter, or transition to either the facsimile relay mode or the text relay mode as well.

The state transition diagram 300 illustrates various states that the network 200 may transition into defining the type of communication session established between the gateways 108 and 112, and defining the manner in which data is transmitted between the gateways 108 and 112.

Unfortunately, one cannot always predict in advance whether or not a given call will be a modem call, and if it is a modem call, whether or not it will be made in modem relay mode and require a gateway to run a modem modulation. To best handle this situation, the decision as to whether a modem call will be established in a first mode (e.g., VBD mode), requiring fewer gateway resources, or in a second mode (e.g., modem relay mode), requiring more gateway resources, can be deferred until after the initial signals are sent from network devices 102 and 106, providing the gateways with enough information to make the decision. Furthermore, either or both communicating gateways may be resource constrained, so the decision to switch to modem relay mode can be confirmed by both gateways at the time the switch is imminent.

End-to-End and Split Automoding

When network devices 102 and 106 connect, either via network 100 or network 200, they exchange an automode sequence of signals to determine a modulation that both devices 102 and 106 support and that will be used for the connection between them. Generally, the sequence is driven by the answering device, which sequentially goes through the steps it has implemented until a modulation is chosen for the connection or it is determined that the two devices have no common modulation implementations.

Between two MoIP endpoints, e.g., first and second gateways 108 and 112, there can be either one or two simultaneous automode sequences. For example, if the gateways monitor the automode signals exchanged end-to-end between the two modems and then switch to modem relay mode if the end modems negotiate an appropriate modulation (i.e., one supported by both gateways), this is referred to as end-to-end automoding. (If the end modems do not negotiate a modulation supported by both gateways, then the connection continues in VBD mode).

Alternately, each gateway can execute a separate automode sequence with its adjacent modem to determine the modulation to be used between them. The call then continues in modem relay mode. This is referred to as split automoding.

Both types of automoding have advantages and disadvantages. Split automoding can result in faster connect times and may result in higher speed connections since split automoding uses modem relay. However, if either gateway/modem pair do not support a common modulation, then the call will fail when it might have succeeded through a circuit switched or VBD connection. On the other hand, end-to-end automoding will always result in a successful connection between the two modems if a successful connection would have been made via a circuit switched network (See FIG. 1). In end-to-end automoding, the modems do not have to implement a large number of modulations because they are able to use VBD mode if a modulation is selected that is not supported by one or both gateways.

Figure 4:
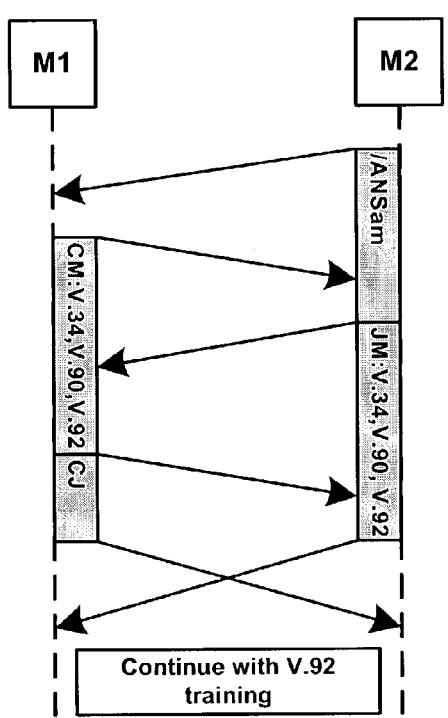
FIGS. 4-5 illustrate examples of exchanging signals between two devices that communicate over a circuit switched network.

FIG. 4 illustrates an example of an exchange of signals between network devices through a circuit switched network. In this example, the devices are modems. For illustration purposes, modem M1 supports the V.34, V.90, and V.92 modulations as well as the V.8 protocol and modem M2 supports the V.22, V.32, V.34, V.90, V.91, and V.92 modulations, as well as the V.8 protocol. The example begins with M2 sending an amplitude modulated answer signal ("/ANSam"), which is an answer tone that is a sinewave signal at 2100 Hz convolved with a 15 Hz signal. This modulated signal also undergoes phase reversals, e.g., a 180 degree phase reversal, at an interval of 450+/−25 ms. The /ANSam tone is sent by modems to disable echo canceling used for voice since data will be transferred. M1 then responds with a calling menu ("CM") signal, to indicate its capabilities. M2 will then send a joint menu ("JM") signal, which indicates the common capabilities of both modems, i.e., this signal is an intersection of modulation and protocol capabilities of the modems. M1 will receive this JM signal and send a call joint ("CJ") signal to confirm the capabilities indicated. M2 will receive this and both M1 and M2 will continue exchanging signals according to the best common modulation scheme (i.e., V.92).

Figure 5:
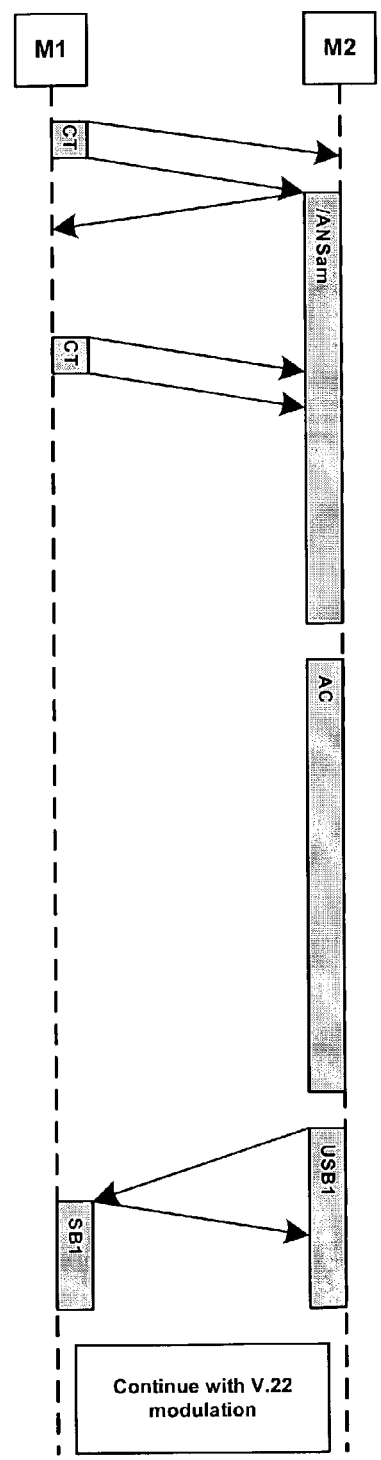

FIG. 5 illustrates another example of an exchange of signals between modems through a circuit switched network. In this example, modem M1 supports only the V.22 modulation, and a low speed calling tone ("CT") is used. M1 will initiate the exchange by sending the CT signal to indicate the type of call. In this instance, the call is a low speed data call, as indicated by the CT signal. Other examples include a high-speed modem call, as would be indicated by a call indicate ("CT") signal or a facsimile call, as would be indicated by a calling ("CNG") signal. After M2 receives the CT signal, it responds with an /ANSam signal. Since M1 does not support the V.8 protocol, M1 ignores the /ANSam signal. M2 will eventually timeout, stop sending the /ANSam signal and then transmit the V.32 AC signal. Since M1 does not support the V.32 modulation, M1 will ignore the AC signal. M2 will again timeout, stop sending the AC signal, and then transmit unscrambled binary ones ("USB1") modulated as defined in Recommendation V.22. M1 will receive these signals and respond by sending scrambled binary ones ("SB1") modulated as defined in Recommendation V.22, and the modems will then continue through the training sequence as defined with reference to the V.22 modulation scheme.

FIGS. 4 and 5 represent end-to-end automoding, i.e., an end-to-end exchange of signals. For each step, the answer modem generates a unique signal that indicates the step of the sequence. If the originate modem has also implemented that step of the sequence, it generates a signal that either identifies a modulation to be used, in which case both modems proceed to use that modulation; or it offers a set modulations to be used, in which case the answer modem generates a signal that identifies the modulation to be used (and again both modems proceed to use that modulation). If the answer modem does not implement any of the modulations in the offered set, it may remain silent, thereby causing the answer modem to time out, and the answer modem may then move on to the next step in the sequence, if any; or the answer modem may explicitly respond indicating that none of the offered set of modulations is supported.

Figure 6:
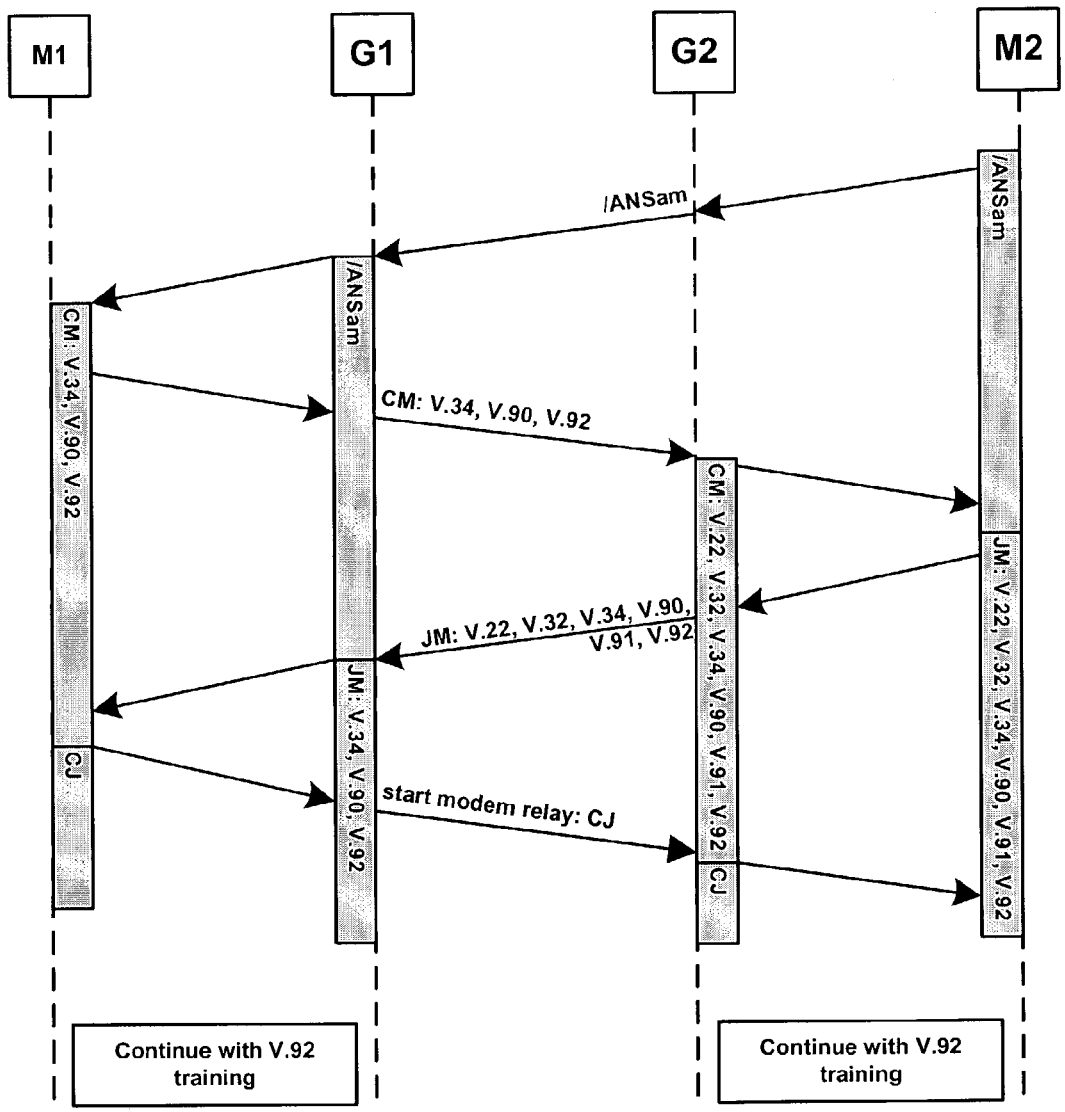
FIGS. 6-12 illustrate examples of exchanging of signals between two devices that communicate over a packet switched network.

FIGS. 4 and 5 illustrate examples where the two modems can communicate directly with each other through a circuit switched network, such as network 100 illustrated in FIG. 1. As another example, consider two modems communicating over a packet network through gateways as shown in FIG. 6. In FIG. 6, modem M1 (e.g., first network device 102) supports the V.34, V.90, and V.92 modulations as well as the V.8 protocol, and modem M2 (e.g., second network device 106) and MoIP gateways G1 and G2 (e.g., first and second gateway 108 and 112) support the V.22, V.32, V.34, V.90, V.91, and V.92 modulations, as well as the V.8 protocol for selecting among the modulations. Also, M1 communicates with G1 through a circuit switched network (e.g., PSTN 104), G1 communicates with G2 through a packet switched network (e.g. IP network 110), and G2 communicates with M2 through another circuit switched network (e.g., PSTN 114). FIG. 6 is an example of an exchange of signals through network 200 as illustrated in FIG. 2.

As shown, the call is answered by M2, which responds to M1 with an /ANSam answer tone as explained above. This signal is sent to G2, which forwards it to G1 and on to M1. M1 will next respond with the CM signal, and M2 then responds with the JM signal. Subsequently, M1 will respond with the CJ signal and the gateways will continue through the training sequence as specified by the V.92 modulation scheme independently with their respective modems, since that may be the best modulation scheme supported by both modems. Additional or alternate signaling could be used, such as signaling according to the V.22 modulation or by using CT, CI, or CNG signaling for example.

FIG. 6 illustrates end-to-end automoding over a packet switched network. Gateways G1 and G2 simply relay messages between modems M1 and M2. In some instances, this arrangement may not be optimal. For example, it may be more effective to train the modems independently of each other throughout the training sequence.

Figure 7:
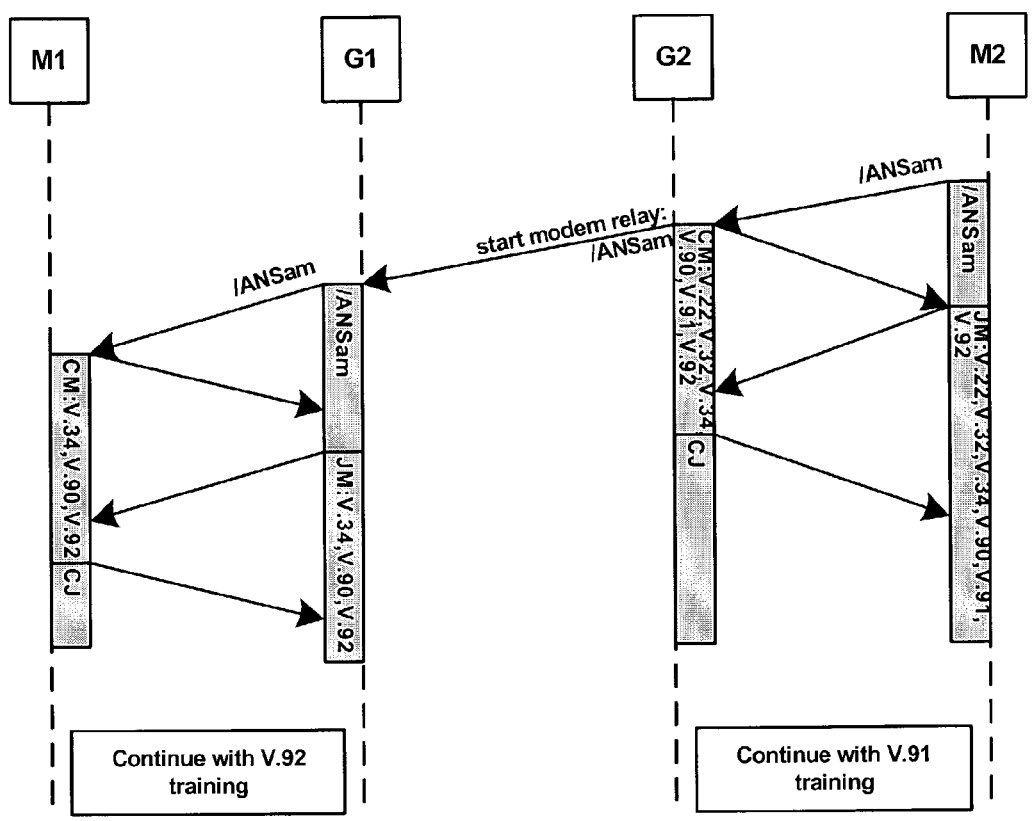

FIG. 7 is an example of split automoding, i.e., training the modems with their respective gateways independently of each other. FIG. 7 illustrates split automoding sequences using modem M1, which supports the V.34, V.90, and V.92 modulations and the V.8 protocol, modem M2, which supports the V.22, V.32, V.34, V.90, V.91, and V.92 modulations and the V.8 protocol, and gateways G1 and G2, which are MoIP gateways and support the modulations and protocols discussed above.

As with some of the previous examples, M2 initially responds to M1's call with an /ANSam answer tone. G2 will receive this signal and forward it to G1. In this instance, the gateways are configured to use split automoding and enter the modem relay mode. M1 and G1 will now communicate with each other to conduct their training sequence, and M2 and G2 will communicate with each other to conduct their training sequence. The split training of the modems may be accomplished more quickly than training the modems in an end-to-end manner.

Figure 8:
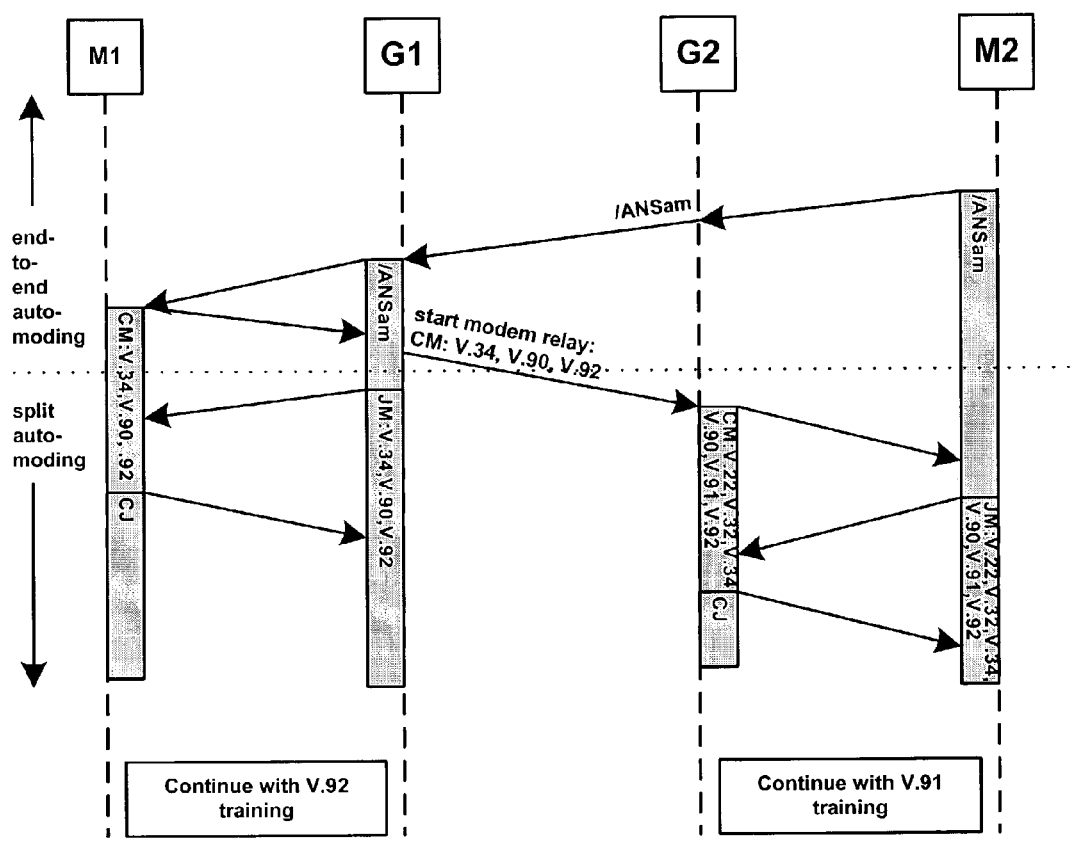

As another example, FIG. 8 illustrates an instance where two modems initially were conducting the training sequences in an end-to-end manner and then switched to the split automoding technique. The modems may always begin a communication session in an end-to-end manner as shown, using a first mode for modulation, e.g., the VBD mode. However, in this example, the gateways may have determined that the split automoding exchange of signals would be optimal in a second mode (e.g., a relay modulation mode, such as the modem relay mode, for example).

Note that in end-to-end automoding the switch to modem relay mode is made when the modulation(s) are selected, and in split automoding the switch to modem relay mode is made at the start of the split of the automode sequence. In cases where either split or end-to-end automoding can be used, the decision to use split or end-to-end automoding can be confirmed at the time the split is imminent.

Call Discrimination Options

When two gateways implementing different deployment strategies first connect, they negotiate and agree on "the common ground" for which they can and will operate through a network (e.g., negotiating whether to exchange signals in the end-to-end or split automode, and negotiating what type of modulation to use for the exchange). This could be accomplished by assigning each deployment strategy a name, and the gateways could then exchange the name of the deployment strategy they implement when they first connect.

Alternatively, each deployment strategy could be broken down into a set of options that are necessary for its implementation and sufficient to distinguish it from all other deployment strategies. The gateways would then exchange the set of options they implement when they first connect, and a common set of options could be selected via predetermined precedence rules.

An option is essentially a choice between two or more alternate ways to accomplish the same thing. If an option has two alternatives, one alternative may be inclusive of the other. That is, the including alternative may have all the properties, capabilities, etc. of the included alternative. Since one alternative or the other must always be chosen for each connection, the included alternative then becomes a mandatory alternative and the including alternative becomes optional.

Some alternatives can be designated as mandatory and others as optional. In other words, a gateway may implement a mandatory alternative alone, or both the mandatory and optional alternatives. There may be cases where a gateway supports an alternative, but not use it even if it connects with another gateway that also supports the alternative.

Many factors may be considered to determine what technique to use to train the modems, such as end-to-end versus split automoding. In addition, the type of call to be established and the associated type of signal exchange (e.g., VoIP, MoIP, or FoIP) depends upon similar factors. The factors may be referred to as call discrimination factors or call discrimination options.

Figure 9:
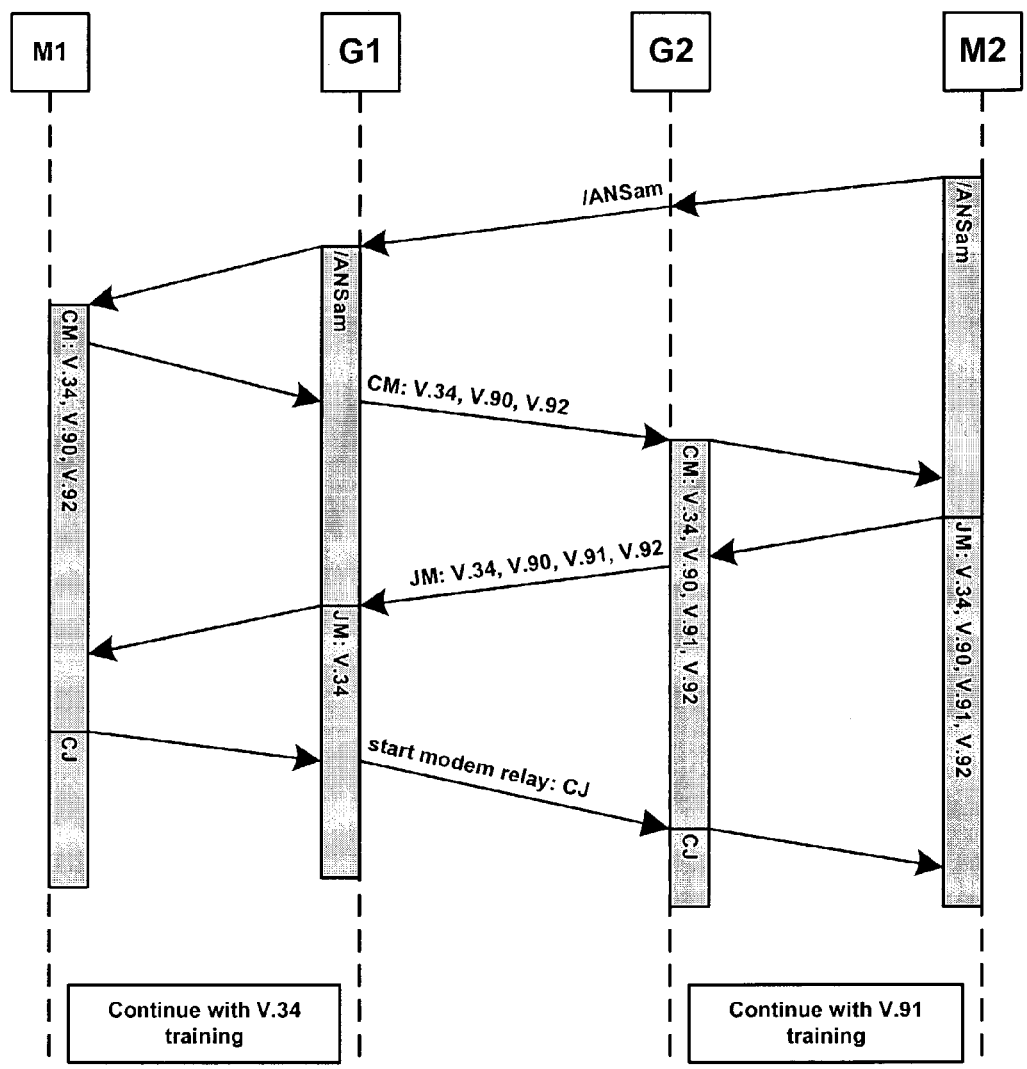

It may be for a particular situation that no call discrimination options are desired. This example is illustrated in an end-to-end automode exchange of signals in FIG. 9. In FIG. 9 (and in FIGS. 10-12) modem M2 and MoIP gateway G2 support the V.34, V.90, V.91, and V.92 modulations and the V.8 protocol for selecting among the modulations, modem M1 supports the V.34, V.90, and V.92 modulations and the V.8 protocol for selecting among the modulations, and MoIP gateway G1 supports only the V.34 modulation and the V.8 protocol necessary for selecting it.

Since G1 only supports V.34, then M1 and G1 will proceed through a training sequence according to the V.34 modulation scheme. However, G2 supports many techniques. Therefore, M2 and G2 can proceed through a training sequence according to a more effective or efficient training sequence, such as the V.91 modulation scheme. Note that if M1 and M2 were connected via a circuit switched network (instead of through G1 and G2), or a VBD connection over a packet switched network, the result would be a connection with only two modems in the connection, and the V.92 modulation scheme would have been used. The result through the packet switched network with MoIP gateways in a modem relay state, however, is a connection with four modems (two modems are in the MoIP gateways), the V.34 modulation being used between modem M1 and gateway G1, and the V.91 modulation being used between modem M2 and gateway G2. Thus a modem-relay connection between the modems will use four modems rather than two; two different modulations; and will be limited in performance according to the capabilities of the gateways, for example by the V.34 modulation due to G1. Any or all of these results may be undesirable. Without the use of any call discrimination options, the connection between the modems may not be optimal.

Figure 10:
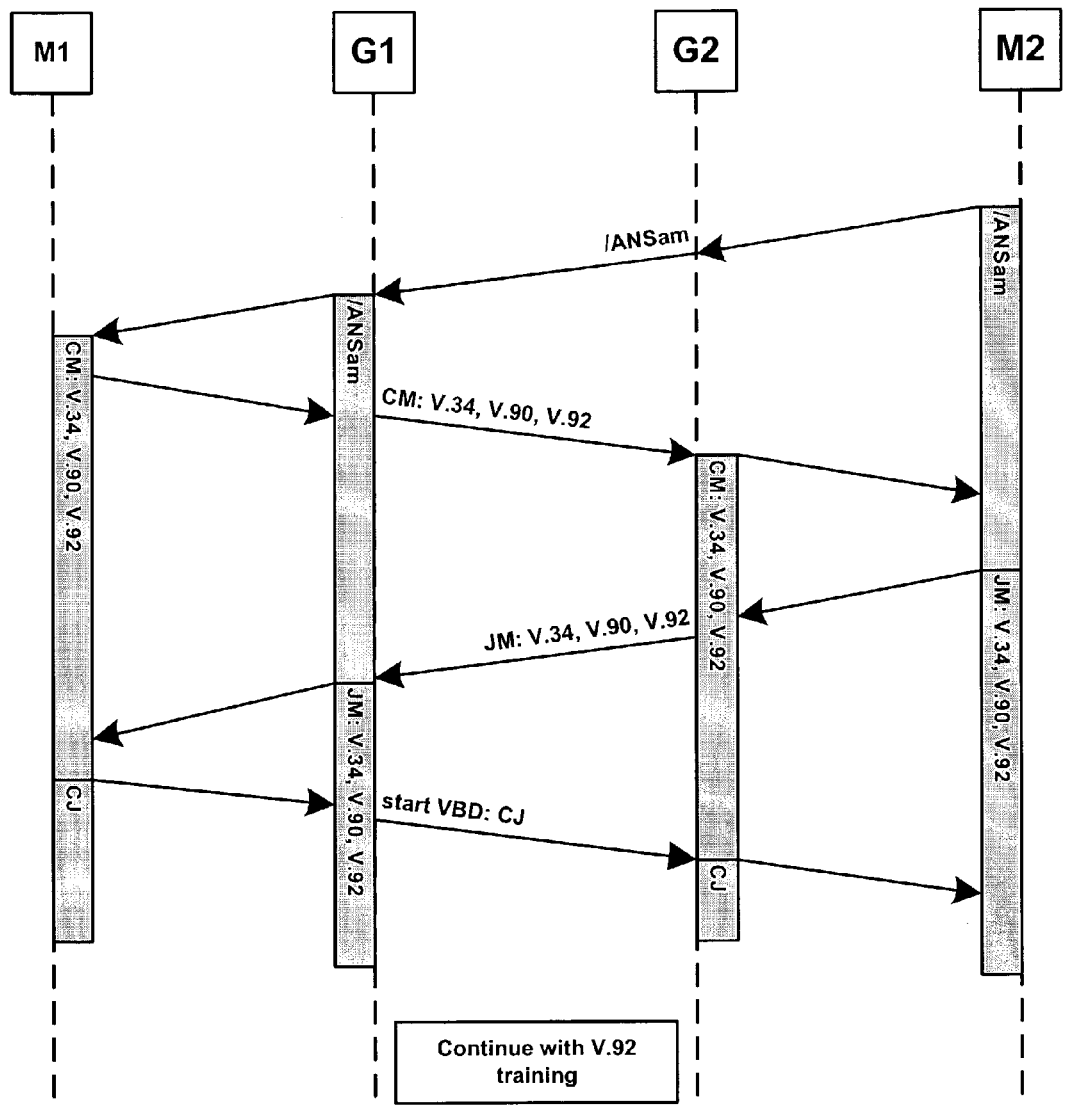

In one embodiment, it may be desirable to force the connection to be a VBD connection rather than a modem relay connection, i.e., to implement a two modem connection instead of a four modem connection. FIG. 10 illustrates a VBD connection over a packet switched network. As shown, the two modems have determined that the V.92 modulation scheme may be the optimal modulation between them and is one that is supported by both modems. Therefore, the modems conduct the training sequence end-to-end using this modulation scheme. Note that, with the VBD call discrimination option in effect, gateway G2 has not included V.91 in its CM signal, gateway G1 has repeated modem M2's JM signal to modem M1, and gateway G2 has selected VBD mode rather than modem relay mode on reception of modem M1's CJ signal.

One advantage of using VBD mode versus modem relay mode is that VBD is most like the complete circuit switched network (e.g., network 100) that the packet switched network (e.g., network 200) partially replaces. For network operators that are concerned about the possible change in operational characteristics of modem calls through their networks that split automoding and/or modem relay mode may cause, as well as the attendant quality-of-service and support issues that may result, VBD-only mode could be regarded as the safest and most preferable option for them.

In another embodiment, to limit the number of modulations used in the end-to-end modem relay connection to a single modulation, it may be desirable to force the connection to be a modem relay connection but with the same modulation used between the two gateways and modems. This may eliminate different modulations being implemented on each leg of a modem relay connection. Therefore, the connection may be established similar to a VBD connection through a circuit switched network where there is only one leg and hence only one modulation used. For example, the connection between the two modems (e.g., a data call), when via a packet switched network and MoIP gateways, can be either in VBD mode, in which case one modulation is used end-to-end between the two modems, or in modem relay mode, in which case two modulations may be used; one between each modem/gateway pair.

Figure 11:
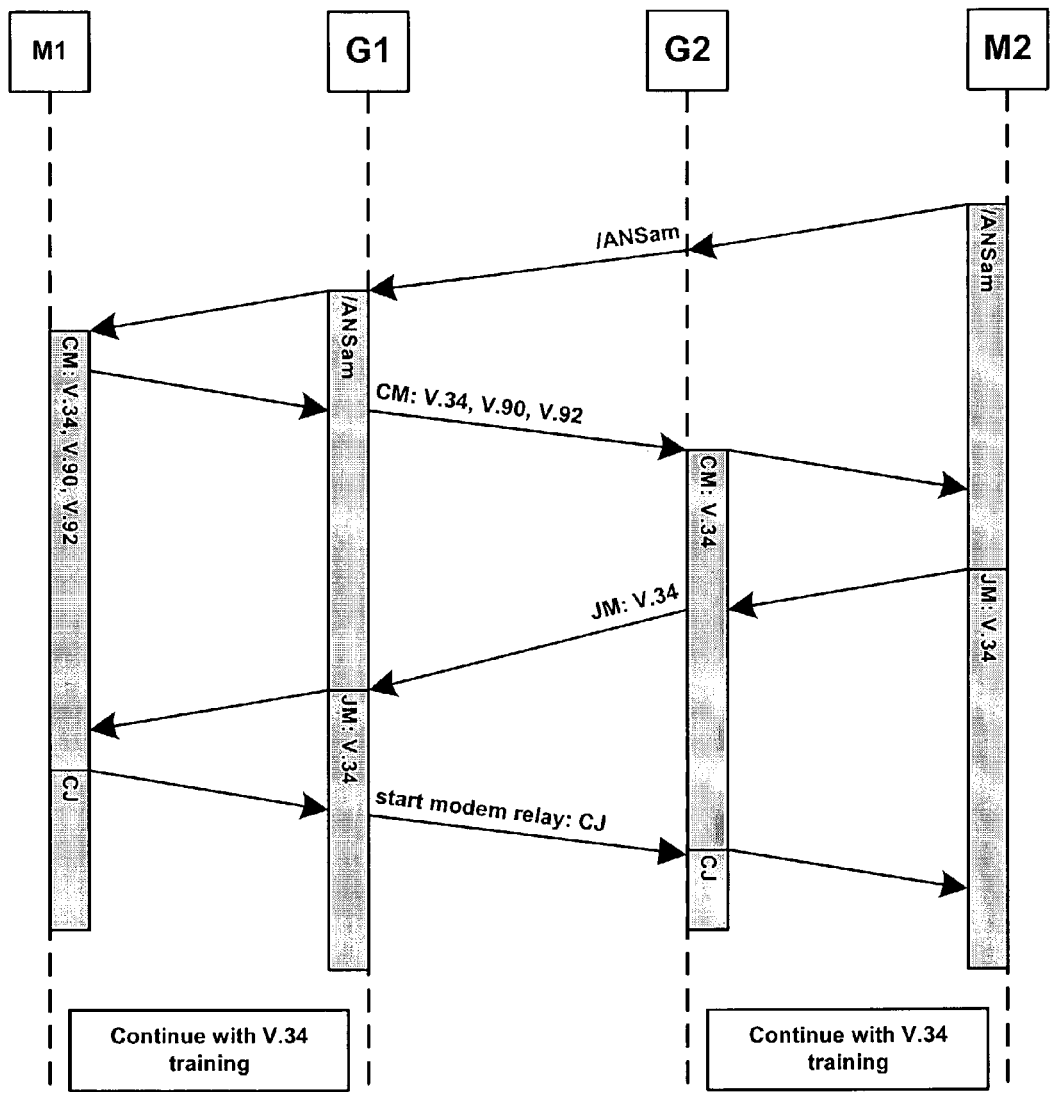

FIG. 11 illustrates an example of an end-to-end modem relay matched modulation connection. Note that with a matched modulation call discrimination option in effect, gateway G2 does not include V.90, V.91, and V.92 (which are not supported by gateway G1 or modem M1) in its CM signal. Since G1 only supports V.34 modulation, the matched modulation is limited by G1. Therefore, the V.34 modulation is chosen.

A matched modulation option may be chosen in a situation where the bandwidth saving benefits of the modem relay mode are desired, but only if the modulations/protocols used in the modem relay mode are the same as would have been used in the VBD mode or in a connection through a circuit switched network. Another advantage with the matched modulation option is that network operators and customers do not have the potential support issues of modem calls connecting differently, as could occur using the modem relay mode.

Figure 12:
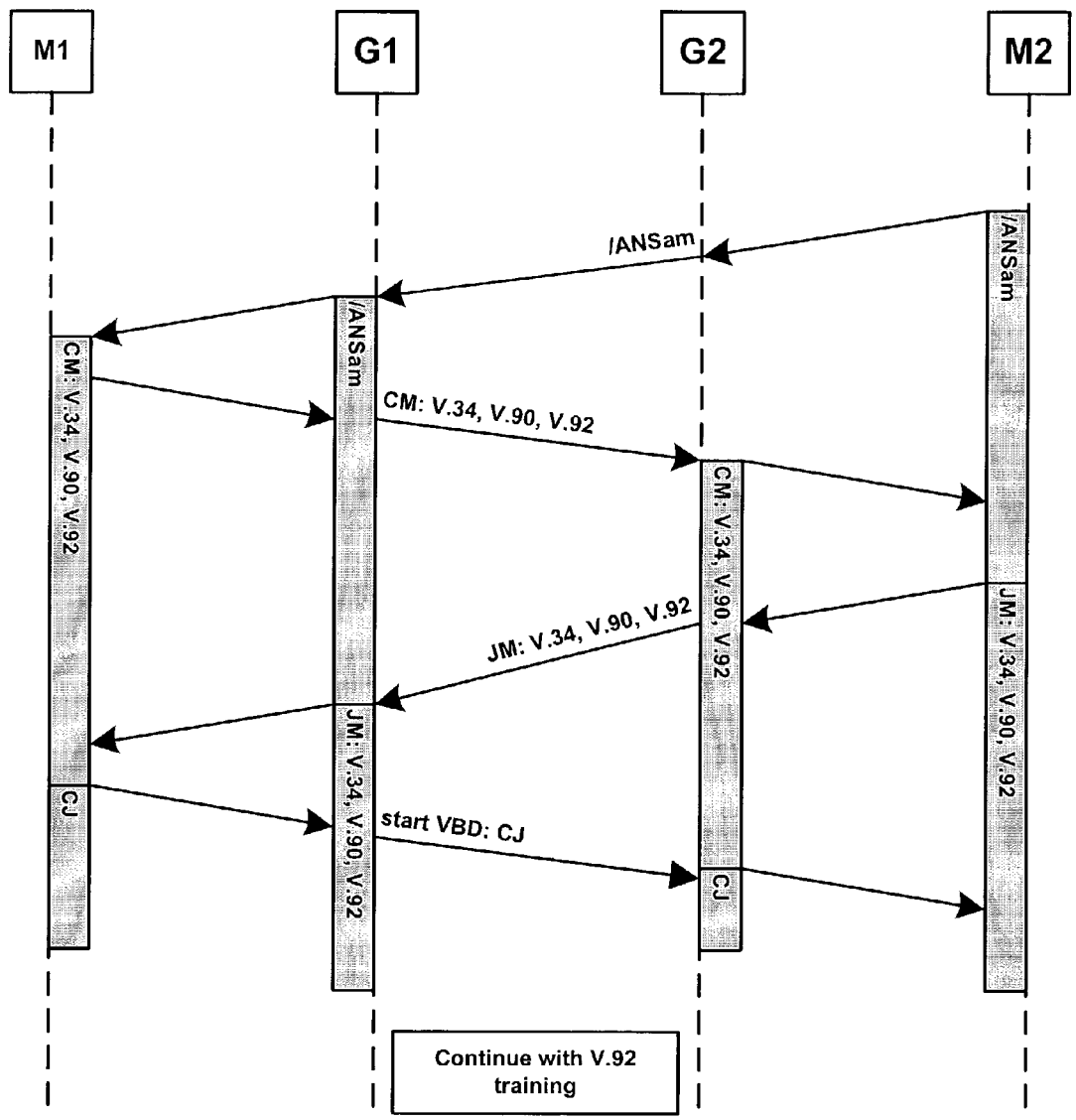

In still another embodiment, to ensure that a modem relay connection is not used if that would entail using a modulation inferior to that used in a circuit switched connection, it may be desirable to force the connection to be a VBD connection rather than a modem relay connection in these situations. FIG. 12 illustrates an example of an end-to-end automode best modulation connection. Note that similar to the VBD only connection option, gateway G2 has not included V.91 in its CM signal, gateway G1 has repeated modem M2's JM signal to modem M1, and gateway G1 has then selected the VBD mode rather than the modem relay mode on reception of modem M1's CJ signal. In this case however, gateway G1's actions are the result of the use of the best modulation option. The VBD mode was chosen since using it implements the best modulation scheme available between the two modems. The capabilities of the gateways can be ignored in the VBD mode, since communication in the VBD mode only involves modulations at the two modems, e.g., M1 and M2.

By contrast, it may be desirable to force the connection to be an MR connection rather than a VBD connection. This may be desirable in an instance where one modem and/or gateway has a low speed or less efficient modulation than the other modem and/or gateway. Therefore, the modems could communicate with their respective gateways in a modem-relay fashion, with only one side of the connection (i.e., modem/gateway pair) maintained at a low modulation rate.

In yet another embodiment, it may be desirable to force end-to-end or split automoding, in addition to using a call discrimination option. One advantage to forcing end-to-end automoding is that this technique retains full support for non-standard modulations. Split automoding may increase the possibility of issues in error correction and data compression protocol negotiation because the time difference between the two ends completing modulation training and beginning error correction and data compression protocol negotiation may be increased, but that increase may be acceptable to a network operator when weighed against the benefits of increased bandwidth savings and modem connection performance. In contrast, one advantage to forcing split automoding is that bandwidth savings and increased modem performance are obtained for the largest possible number of modem calls over the VBD only or matched modulations deployment strategies.

In the above examples illustrated in FIGS. 9-12, gateway G2 and modem M2 are physically distinct network elements connected by a circuit switched network. There may be an advantage, however, to having gateway G2 and modem M2 built into the same physical network element. For example, in this arrangement, the circuit switched network connection between G2 and M2 would be eliminated, and the gateway and modem interfaces required to connect to the circuit switched network would also be eliminated. This can result in a significantly lower complexity and cost to implement gateway G2 and modem M2. Additionally, gateway and modem resources required to implement modulations over the circuit switched network may be eliminated, resulting in even less complexity and cost. A combined gateway/modem without certain resources may not be able to accept VBD connections. This limits its deployment possibilities, but may be acceptable and advantageous in certain circumstances.

Integrated gateway/modems may optimally be able to process modem calls. This can be achieved by special routing in the IP network based on a called number, for example. An integrated gateway/modem can be especially advantageous to delay-sensitive applications such as gaming and transaction processing.

In a combined gateway/modem connection, there may be no modulations used between gateway G2 and modem M2 (and no modulation training), and therefore, there is no need for an automode sequence between them. In a gateway that does not have the adjacent modem built into it, split automoding is presumed to be more complex and costly to support than end-to-end automoding. Therefore, split automoding is presumed to be an option in MoIP gateways, while end-to-end automoding is presumed to be required. In a combined gateway/modem, end-to-end automoding is more complex and costly to support than split automoding. For a combined gateway/modem that does not support end-to-end automoding, it may be necessary to have a call discrimination option that requires the use of split automoding and modem relay connections.

Figure 13:
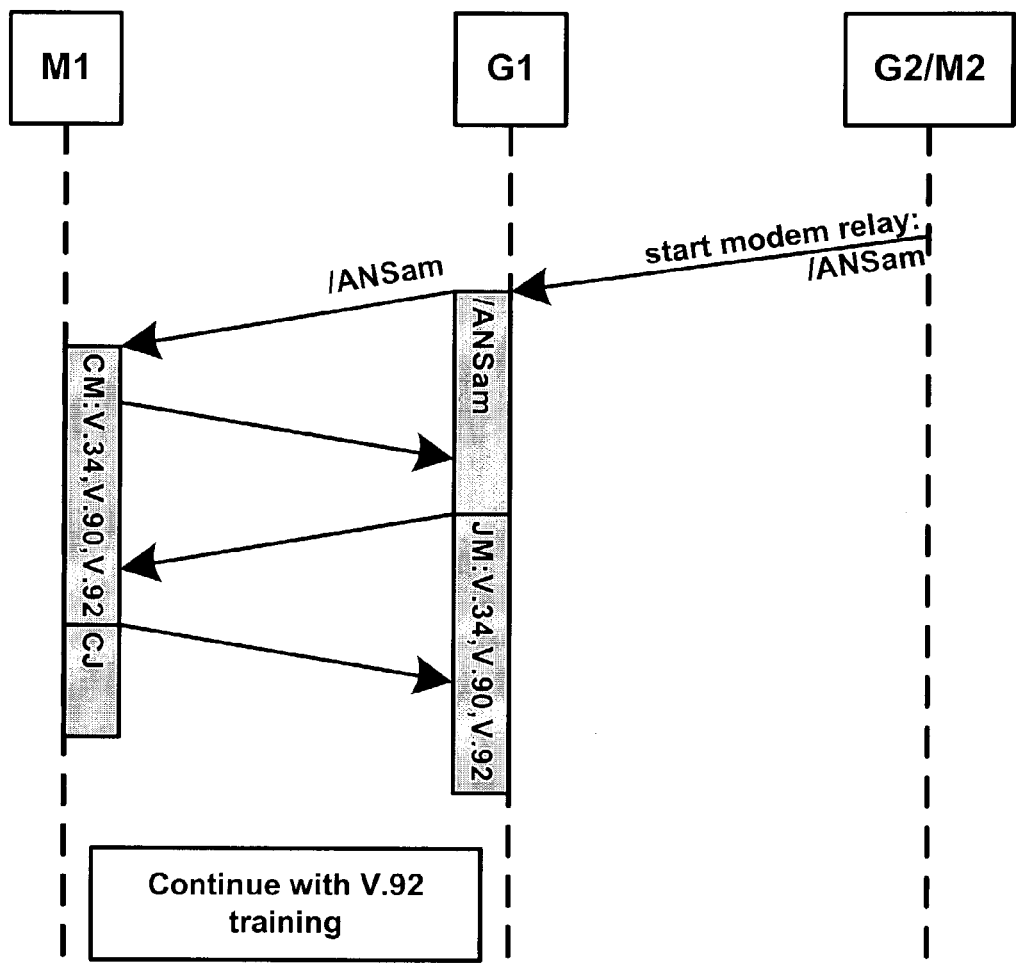
FIG. 13 illustrates one embodiment of a combined gateway/modem connection.

FIG. 13 illustrates a combined gateway/modem connection between two modems; one of which (M2) is built into an MoIP gateway, and one of which (M1) is separate from a gateway. Gateway G1 supports the V.22, V.32, V.34, V.90, V.91, and V.92 modulations and the V.8 protocol for selecting among the modulations. Modem M1 supports the V.34, V.90, and V.92 modulations and the V.8 protocol, and neither CT, CI, nor CNG is used. Therefore, M1 and G1 negotiate to implement the V.92 modulation scheme.

Call Discrimination Option Negotiation

With many, if not most options, the advantages of using the option far out-weigh the disadvantages, if any, of using the option. With these options then, the option will generally be used if it is supported. In the case of an option whose support is distributed between two connected network elements, the option will be used for a connection between two network elements if both network elements support the option. Any of the above options may be used, such as the force VBD option, the force MR option, the matched modulation option, the best modulation option, the force end-to-end automoding option, the force split automoding option, or to choose no options. Other options may be available as well.

Call discrimination option negotiation may be carried out by two network elements signaling to each other during the connection set up. The signaling informs each network element of each other's supported options. In one instance, if both network elements support the option, it is used for the connection between them. Alternatively, if either network element does not support the option, it is not used.

Figure 14:
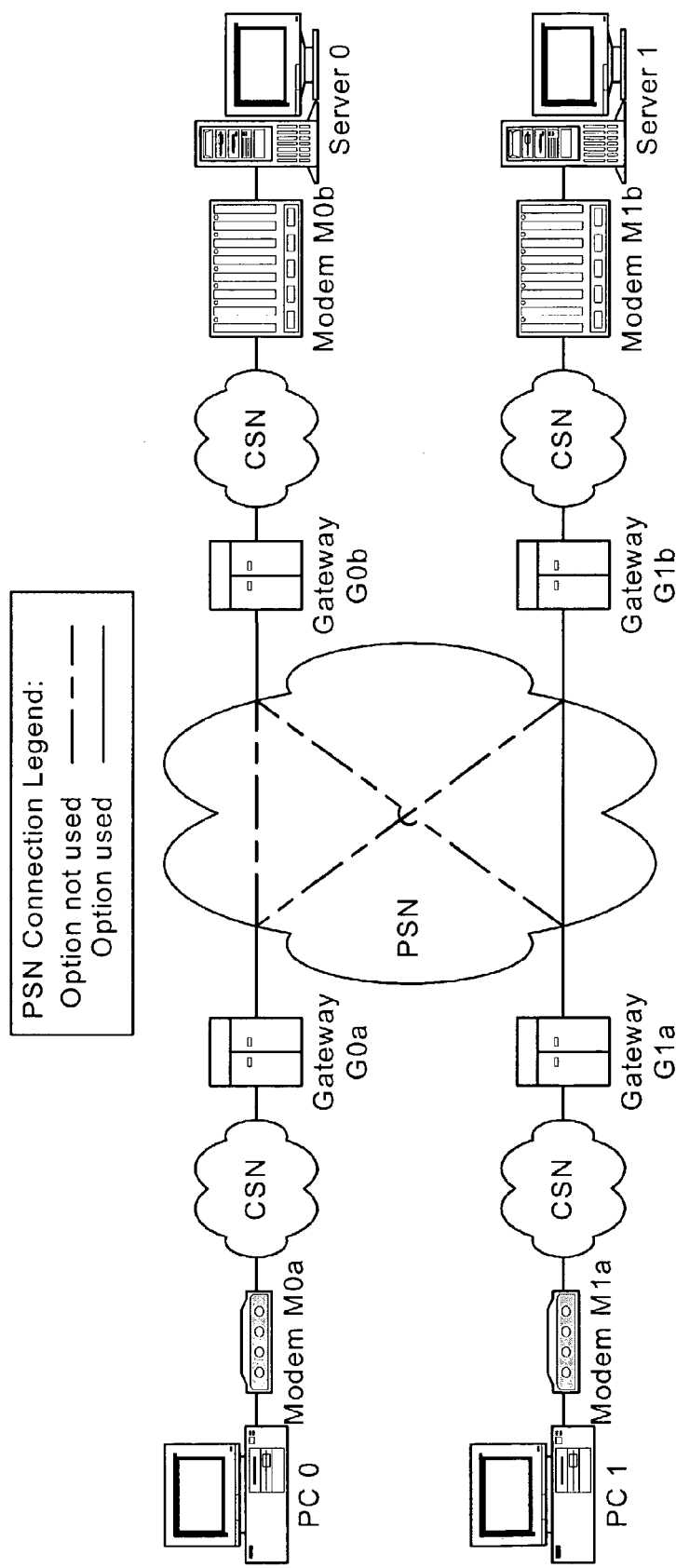
FIG. 14 illustrates one embodiment of a packet switched network connection using call discrimination options.

FIG. 14 illustrates one embodiment of a packet switched network ("PSN") connection (such as an IP network connection) using the call discrimination options. Gateways and modems denoted with an "a" are located at one end of the packet network, and gateways and modems denoted with a "b" are located at the opposite end of the packet network. The modems communicate with the gateways through a circuit switched network ("CSN"), such as the PSTN. In this example, gateways G0a and G0b do not support a particular option and gateways G1a and G1b do support the option. In this example, the option will only be used on the connection between gateways G1a and G1b, as illustrated in FIG. 14 and Table 1 below, because that is the connection where both gateways involved are compatible with regard to the particular option.

TABLE 1

| Option Used on Connection between | G0b | G1b |
|---|---|---|
| G0a | N | N |
| G1a | N | Y |

For the end-to-end automoding options described above, the advantages of using an option do not necessarily out-weigh the disadvantages. An advantage in one situation may be a disadvantage in an alternate configuration, and vice versa. A gateway then could not support the option, support the option and prefer that it be used, or support the option but prefer not to use it.

As one example, in a given connection, an option would be used if and only if both gateways supported the option, and one or the other or both gateways preferred its use. This may be determined by the two gateways signaling to each other during connection set up to determine whether or not each gateway supports the option, and if the option is supported, whether or not the use of the option is preferred.

Figure 15:
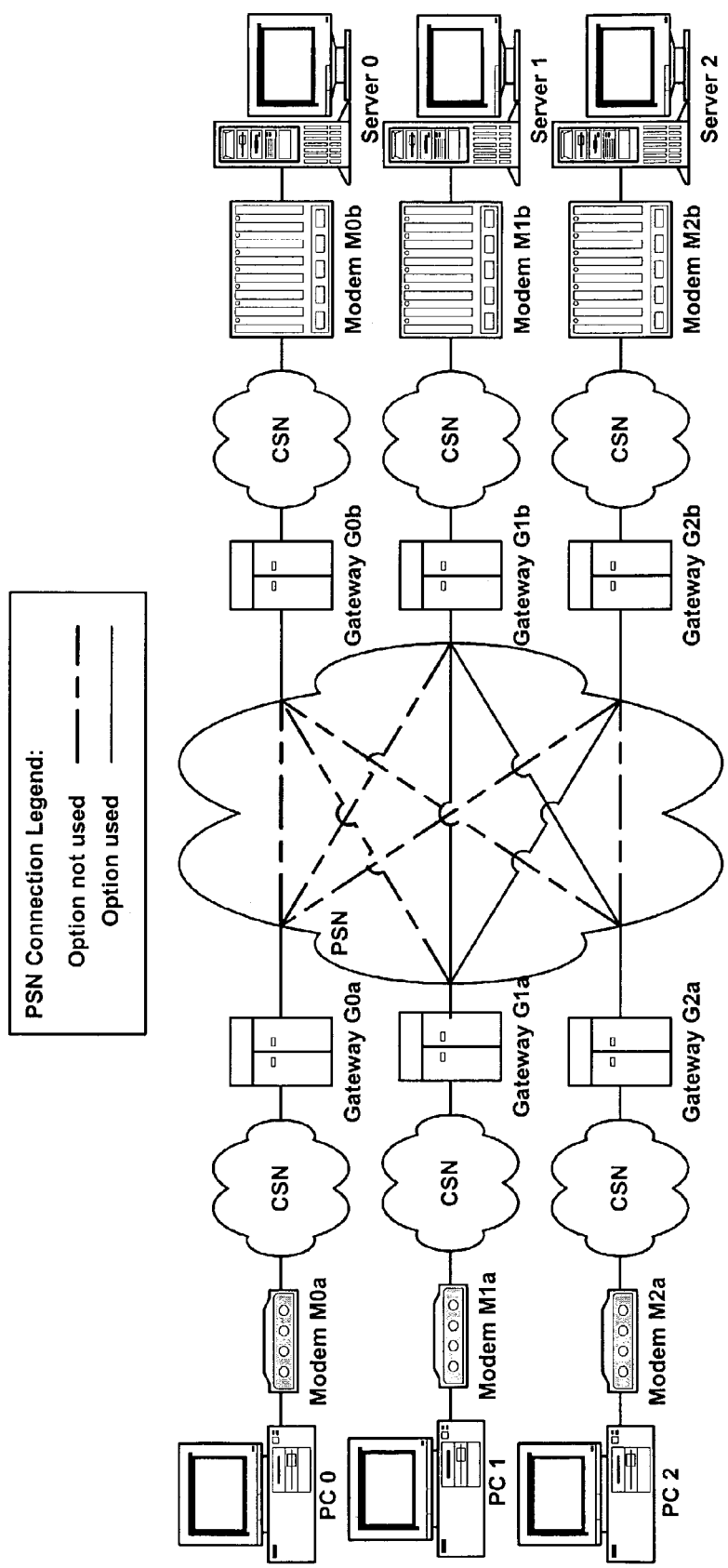
FIG. 15 illustrates another embodiment of a packet switched network connection using call discrimination options.

FIG. 15 illustrates another embodiment of a PSN connection using the call discrimination options. In this example, if both gateways support the option and either or both gateways prefer it to be used, then it is used for the connection between them. If either gateway does not support the option, then it is not used. This is illustrated in Table 2 below. Gateways G0a and G0b do not support the option, gateways G1a and G1b do support the option and prefer it to be used, and gateways G2a and G2b support the option but prefer not to use it. The option will only be used on the connection between gateways G1a and G1b, between gateways G1a and G2b, and between gateways G2a and G1b because those combinations of gateways illustrate compatible connections using the particular option.

TABLE 2

| Option Used on Connection between | G0b | G1b | G2b |
|---|---|---|---|
| G0a | N | N | N |
| G1a | N | Y | Y |
| G2a | N | Y | N |

The signaling between the two network elements, e.g., gateways, may be accomplished by having the two network elements exchange, at call setup, an integer (or any type of variable or identifier), which indicates the options supported by the elements and the preference for using them.

If both gateways of a connection implement both types of automoding (e.g., end-to-end and split), then they must negotiate at call setup the type that will be used for the call. In this negotiation, priority could be given to the preference of a gateway adjacent to server modems over the preference of a gateway adjacent to client modems. Thus, the negotiation may be performed by the two gateways exchanging an integer at call setup (where a respective integer is associated with each respective gateway), which indicates their capability and preference for automoding. In one example, the integers may be arranged as follows in Table 3.

TABLE 3

| Integer | Explanation |
|---|---|
| 0 | Split automoding is not supported, only end-to-end |
| 1 | Both end-to-end and split automoding are supported, but split is preferred |
| 2 | Both end-to-end and split automoding are supported, but end-to-end is preferred |

The first variable, "0", indicates that split automoding is not supported by a particular gateway; only end-to-end automoding is supported. This may be the case where a particular gateway does not have modem capabilities, or is not a MoIP gateway. The second variable, "1", indicates that both end-to-end and split automoding are supported by the particular gateway, but split automoding is preferred, possibly due to the increased bandwidth capabilities. Lastly, the third variable, "2", indicates that both end-to-end and split automoding are supported, but end-to-end is preferred.

After the integers are exchanged, each endpoint computes the minimum of the two exchanged integers, and uses end-to-end automoding if the minimum is 0 or 2, and split automoding only if the minimum is 1. The minimum integer detected can thus control the decision of the gateways. Other types of identifiers can be exchanged between gateways as well, such as variables that designate the above options as listed in Table 3. For example, a variable exchange of "A", "B", and "C" could be made and the minimum integer detection could be replaced with an alphabetical ordering detection where the option designated by an alphabet first in the order would control the decision of the gateways. Other examples are possible as well.

The negotiation between the end-to-end and split automode exchange of signals enables both gateways to determine a compatible manner in which to exchange signals.

In addition, negotiation of call discrimination options, as described above, may be accomplished as well by exchanging integers between the gateways. For example, the gateways may negotiate whether or not to force using the VBD mode by exchanging integers arranged as follows in Table 4 below.

TABLE 4

| Integer | Explanation |
| --- | --- |
| 0 | forcing voice band data connections is not supported |
| 1 | forcing voice band data connections is supported and is preferred to modem relay connections |
| 2 | forcing voice band data connections is supported, but modem relay connections are preferred when possible |

The integers of Table 4 may be used to designate any first and second mode option negotiation. As shown in Table 4, the integer "0" designates forcing a first mode (e.g., VBD) connection is not supported; the integer "1" designates forcing a first mode (e.g., VBD) is supported and is preferred to a second mode connection (e.g., modem relay); and the integer "2" designates forcing a first mode (e.g., VBD) is supported, but a second mode (e.g., modem relay) is preferred when possible.

After the integers are exchanged, each endpoint computes the minimum of the two. The endpoints will then use the modem relay mode if possible, e.g., if the minimum is 0 or 2, and always use the voice band data mode if the minimum is 1. This assumes that the call has been determined to be a data call, and the gateways simply need to decide whether to use the VBD or modem relay mode. The exchange of the integers allows the gateways to negotiate a compatible type of modulation to be used between them and between their associated network modems.

Another option that may be negotiated at call setup by the gateways by exchanging integers may be the matched modulation option. Integers that indicate the capability and preference of the sending endpoint for forcing matched modulations may be arranged as follows in Table 5.

TABLE 5

| Integer | Explanation |
| --- | --- |
| 0 | matching modulations is not supported |
| 1 | matching modulations is supported and its use is preferred |
| 2 | matching modulations is supported, but its use is not preferred |

After the integers are exchanged, each endpoint computes the minimum of the two, and does not force matched modulations if the minimum is 0 or 2, but forces matched modulations if the minimum is 1. Again, the exchange of integers allows the gateways to establish a compatible type of modulation to be used.

If different modulations are used on the two legs of a modem relay connection, it is possible that both modulations are at least as good as the modulation that would have been used in a VBD mode or circuit switched connection. To eliminate the possibility of not using the best modulation, MoIP gateways can implement an optional procedure that forces a VBD mode connection if that would result in a modulation that is better than either or both of the modulations that would be used in a mode relay connection. Again, this option may be negotiated at call setup by the gateways exchanging integers whose values indicate the capability and preference of the sending gateway for forcing the best modulation option. Integers may be arranged as follows in Table 6 below.

TABLE 6

| Integer | Explanation |
| --- | --- |
| 0 | using best modulations is not supported |
| 1 | using best modulations is supported and its use is preferred |
| 2 | using best modulations is supported, but its use is not preferred |

After the integers are exchanged, each gateway computes the minimum of the two, and does not force a voice band data mode connection if the modem relay mode modulations would result in a better modulation, as indicated if the minimum is 0 or 2, and forces a voice band data mode connection if that would result in a better modulation than one or both of the modem relay mode modulations, as indicated if the minimum is 1.

Similar negotiated preference options could be defined for all options that are specified by the gateways to allow the characterization of all deployment strategies. In addition, other options not described herein could be implemented.

Moreover, other types of negotiations could occur between two gateways, or other network devices to agree on which call discrimination options to use for a particular call. The three level integer negotiation and corresponding minimum integer detection described herein is only one example, since the integers could be arranged in any desired manner and the corresponding detection scheme could be adjusted as needed. For example, arranging the integers opposite than described, the gateways could implement a maximum integer detection and decision scheme. Other examples are possible as well.

Figure 16:
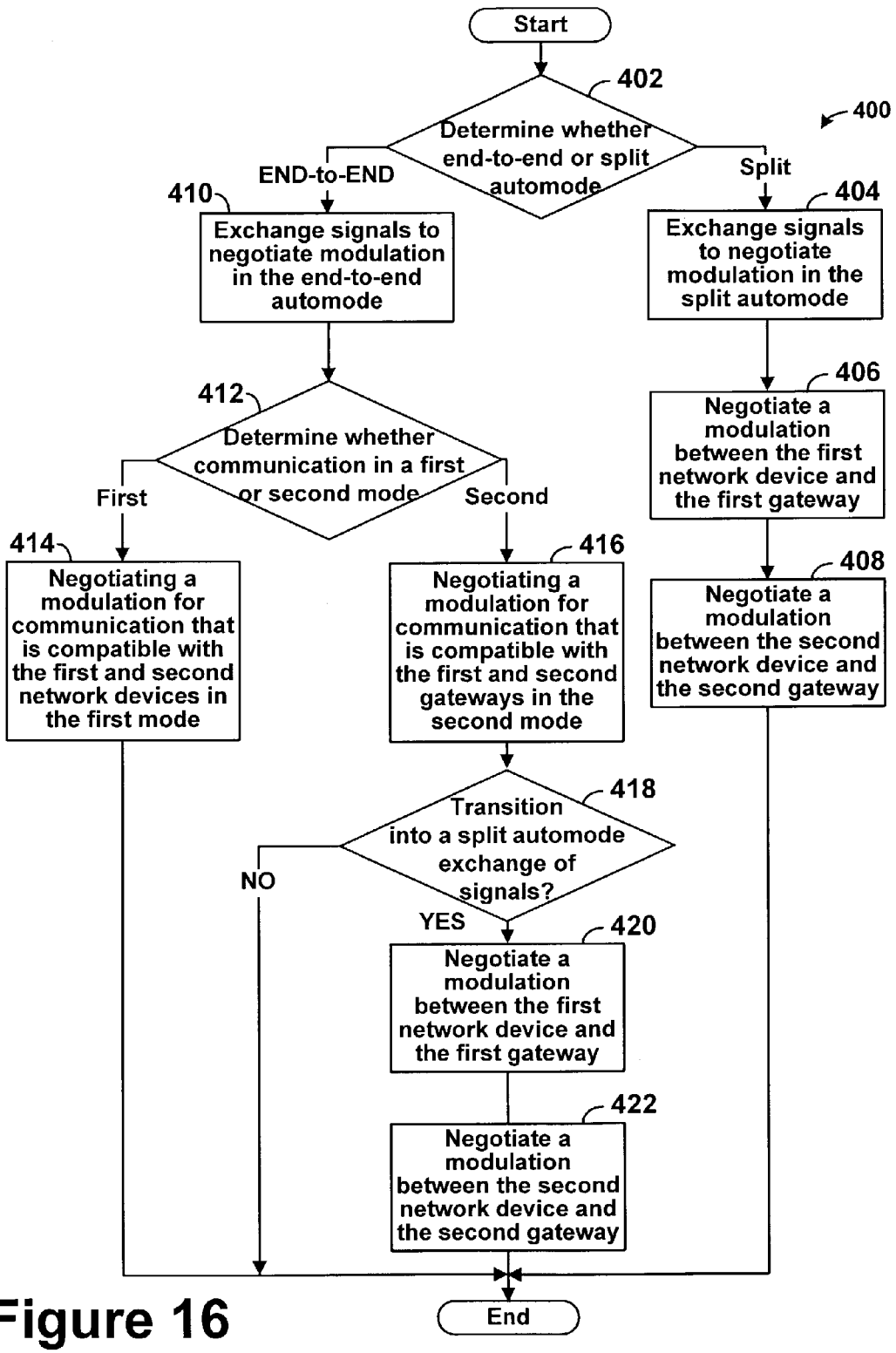
FIG. 16 is a flowchart depicting one embodiment of a method of communicating between modems through gateways according to the present invention.

FIG. 16 is a flowchart depicting one embodiment of a method 400 of communicating between modems through gateways. To begin, the gateways can exchange a set of variables to determine whether to communicate using an end-to-end or a split automode, as shown at step 402. If the gateways' compatibilities determine that the split automode is desired, then the gateways exchange signals to negotiate modulation in the split automode, as shown at step 404. Next, the first gateway will negotiate a modulation that is compatible between itself and the first network device, and the second gateway will negotiate a modulation that is compatible with itself and the second network device, as shown at steps 406 and 408.

If the gateways' compatibilities determine that the end-to-end automode is desired, then the gateways exchange signals to negotiate a modulation in the end-to-end automode, as shown at step 410. Next, the gateways will determine whether to communicate in a first or second mode (such as in the VBD or the modem relay mode, for example), as shown at step 412. If the first mode is negotiated, then the gateways enable the first and second network devices to negotiate a modulation for communication that is compatible with both the first and second network devices in the first mode, as shown at step 414. If the second mode is negotiated, then the gateways enable the first and second network devices to negotiate a modulation for communication that is compatible with both the first and second gateways in the second mode, as shown at step 416.

While in the second mode, e.g., modem relay mode, the exchange of signals may transition from the end-to-end automode into the split automode, as shown at step 418. This transition may occur if the gateways determine that the modem relay mode is supported and is preferred by at least one of the gateways, for example. Next, the first network device and the first gateway will negotiate a modulation for communication that is compatible between them, as shown at step 420. At the same time, the second network device and the second gateway will negotiate a modulation for communication that is compatible between them, as shown at step 422.

In method 400, the gateways exchange numerous signals to determine various signaling options. For example, the gateways exchange signals to determine whether to use end-to-end or split automode, to determine whether to communicate in a first or second mode (e.g., VBD or modem relay), and to determine whether to transition into the split mode if operating in the end-to-end mode. Upon setup, the gateways may exchange one set of values or variables that are indicative of each of these options. For example, the values may be the integers arranged as in Tables 3, 4, 5, and 6. The variables can be arranged in a data packet that has multiple data fields, and each data field may designate a different option.

Alternatively, the gateways may exchange the control signals when presented with an opportunity to choose a specific option. For example, as shown in FIG. 16, the gateways initially exchange signals to simply determine whether to use end-to-end or split automode. They do not exchange signals to determine whether to operate in a first or second mode until they have already begun operating in the end-to-end automode.

While exemplary embodiments have been described, persons of skill in the art will appreciate that variations may be made without departure from the scope and spirit of the invention. The true scope and spirit of the present invention is defined by the appended claims, which may be interpreted in light of the foregoing.

We claim:

1. In a network comprising a first network device in communication with a first gateway, a second gateway in communication with the first gateway, and a second network device in communication with the second gateway, a method for communicating between the first and second network devices through the first and second gateways, the method comprising:

determining whether automode signals should be exchanged between the first and second network devices and the first and second gateways in an end-to-end automode or a split automode based on a minimum of values exchanged between the first and second gateways;

exchanging the automode signals between the first and second network devices to negotiate a modulation for communication between the first and second network devices, when in the end-to-end automode; and exchanging automode signals between the first network device and the first gateway to negotiate a modulation for communication between the first network device and the first gateway, and exchanging automode signals between the second network device and the second gateway to negotiate a modulation for communication between the second network device and the second gateway, when in the split automode.

2. The method of claim 1 further comprising, when in the end-to-end automode, the steps of:

determining whether the communication between the first and second network devices should be in a first mode or a second mode;

negotiating a modulation for communication that is compatible with both the first and second network devices when the communication is in the first mode; and negotiating a modulation for communication that is compatible with both the first and second gateways when the communication is in the second mode.

3. The method of claim 2 wherein the first mode is a voice band data mode, and the second mode is a relay mode.

4. The method of claim 3 wherein the relay mode is a modem relay mode.

5. The method of claim 2 further comprising:

assigning a first value for indicating that forcing first mode connections is not supported by a gateway;

assigning a second value for indicating that forcing first mode connections is supported by a gateway and is preferred to second mode connections by the gateway;

assigning a third value for indicating that forcing first mode connections is supported by a gateway, but second mode connections are preferred by the gateway when possible;

associating one of the values with each of the first and second gateways to indicate which connection modes are supported and preferred by the gateway;

exchanging the associated values between the first and second gateways; and determining whether connections should be in the first mode or the second mode based on the minimum of the values exchanged between the first and second gateways.

6. The method of claim 1 wherein the first network device is connected to the first gateway via a first circuit switched network, the second gateway is connected to the first gateway via a packet switched network, and the second network device is connected to the second gateway via a second circuit switched network.

7. The method of claim 1 further comprising, when in the split automode:

negotiating a first modulation for communication between the first network device and the first gateway that is compatible with both the first network device and the first gateway; and negotiating a second modulation for communication between the second network device and the second gateway that is compatible with both the second network device and the second gateway.

8. The method of claim 1 further comprising:

assigning a first value for indicating that the end-to-end automode is supported by a gateway, but the split automode is not supported by the gateway;

assigning a second value for indicating that the end-to-end and split automodes are both supported by a gateway, but the split automode is preferred by the gateway;

assigning a third value for indicating that the end-to-end and split automodes are both supported by a gateway, but the end-to-end automode is preferred by the gateway;

associating one of the values with each of the first and second gateways to indicate which automodes are supported and preferred by the gateway;

exchanging the associated values between the first and second gateways; and determining whether automode signals should be exchanged in the end-to-end automode or the split automode based on the minimum of the values exchanged between the first and second gateways.

9. The method of claim 1 further comprising matching a modulation for communication between the first network device and the first gateway with a modulation for communication between the second network device and the second gateway.

10. The method of claim 9 further comprising:
assigning a first value for indicating that matching modulation is not supported by a gateway;
assigning a second value for indicating that matching modulation is supported by a gateway, and its use is preferred by the gateway;
assigning a third value for indicating that matching modulation is supported by a gateway, but its use is not preferred by the gateway;
associating one of the values with each of the first and second gateways to indicate whether matching modulation is supported and preferred by the gateway;
exchanging the associated values between the first and second gateways; and
determining whether matching modulation should be used by the first and second gateways based on the minimum of the values exchanged between them.

11. The method of claim 1 further comprising, when in the end-to-end automode, determining whether the communication between the first and second network devices should be in a first mode or a second mode based on which mode provides a successful connection for the communication.

12. The method of claim 11 further comprising:
assigning a first value for indicating that best modulation is not supported by a gateway;
assigning a second value for indicating that best modulation is supported by a gateway, and its use is preferred by the gateway;
assigning a third value for indicating that best modulation is supported by a gateway, but its use is not preferred by the gateway;
associating one of the values with each of the first and second gateways to indicate whether best modulation is supported and preferred by the gateway;
exchanging the associated values between the first and second gateways; and
determining whether best modulation should be used by the first and second gateways based on the minimum of the values exchanged between them.

13. In a network comprising a first network device in communication with a first gateway, a second gateway in communication with the first gateway, and a second network device in communication with the second gateway, a method for communicating between the first and second network devices through the first and second gateways, the method comprising:

using an end-to-end automode to exchange automode signals between the first and second network devices;

exchanging the automode signals between the first and second network devices to negotiate a modulation for communication between the first and second network devices;

determining whether the communication between the first and second network devices should be in a first mode or a second mode based on a minimum of values exchanged between the first and second gateways;

negotiating a modulation for communication that is compatible with both the first and second network devices when the communication is in the first mode; and negotiating a modulation for communication that is compatible with both the first and second gateways when the communication is in the second mode.

14. The method of claim 13 wherein the first network device is connected to the first gateway via a first circuit switched network, the second gateway is connected to the first gateway via a packet switched network, and the second network device is connected to the second gateway via a second circuit switched network.

15. The method of claim 13 wherein the first mode is a voice band data mode, and the second mode is a relay mode.

16. The method of claim 15 wherein the relay mode is a modem relay mode.

17. The method of claim 13 further comprising:
assigning a first value for indicating that forcing first mode connections is not supported by a gateway;
assigning a second value for indicating that forcing first mode connections is supported by a gateway and is preferred to second mode connections by the gateway;
assigning a third value for indicating that forcing first mode connections is supported by a gateway, but second mode connections are preferred by the gateway when possible;
associating one of the values with each of the first and second gateways to indicate which connection modes are supported and preferred by the gateway;
exchanging the associated values between the first and second gateways; and
determining whether connections should be in the first mode or the second mode based on the minimum of the values exchanged between the first and second gateways.

18. The method of claim 13 further comprising, when in the second mode, matching a modulation for communication between the first network device and the first gateway with a modulation for communication between the second network device and the second gateway.

19. The method of claim 18 further comprising:
assigning a first value for indicating that matching modulation is not supported by a gateway;
assigning a second value for indicating that matching modulation is supported by a gateway, and its use is preferred by the gateway;
assigning a third value for indicating that matching modulation is supported by a gateway, but its use is not preferred by the gateway;
associating one of the values with each of the first and second gateways to indicate whether matching modulation is supported and preferred by the gateway;
exchanging the associated values between the first and second gateways; and
determining whether matching modulation should be used by the first and second gateways based on the minimum of the values exchanged between them.

20. The method of claim 13 further comprising determining whether the communication between the first and second network devices should be in the first mode or the second mode based on which mode provides a successful connection for the communication.

21. The method of claim 20 further comprising:
assigning a first value for indicating that a modulation is not supported by a gateway;
assigning a second value for indicating that a modulation is supported by a gateway, and its use is preferred by the gateway;
assigning a third value for indicating that a modulation is supported by a gateway, but its use is not preferred by the gateway;
associating one of the values with each of the first and second gateways to indicate whether the modulation is supported and preferred by the gateway;
exchanging the associated values between the first and second gateways; and
determining whether the modulation should be used by the first and second gateways based on the minimum of the values exchanged between them.

22. In a network comprising a first network device in communication with a first gateway, a second gateway in communication with the first gateway, and a second network device in communication with the second gateway, a method for communicating between the first and second network devices through the first and second gateways, the method comprising:
using an end-to-end automode to exchange automode signals between the first and second network devices;
exchanging the automode signals between the first and second network devices to negotiate a modulation for communication between the first and second network devices;
determining whether the communication between the first and second network devices should be in a relay mode based on a minimum of values exchanged between the first and second gateways;
transitioning into a split automode to exchange automode signals between the first and second network devices and the first and second gateways, when in the relay mode;
negotiating a first modulation for communication between the first network device and the first gateway that is compatible with both the first network device and the first gateway; and
negotiating a second modulation for communication between the second network device and the second gateway that is compatible with both the second network device and the second gateway.

23. The method of claim 22 wherein the first network device is connected to the first gateway via a first circuit switched network, the second gateway is connected to the first gateway via a packet switched network, and the second network device is connected to the second gateway via a second circuit switched network.

24. The method of claim 22 wherein the relay mode is a modem relay mode.

* * * * *